Dec. 13, 1960 C. J. PRANGE Re. 24,908

POWER BUCKET MACHINE

Original Filed Oct. 1, 1957 3 Sheets-Sheet 1

INVENTOR.
CHARLES J. PRANGE
BY
Lynn L. Patta
ATTORNEY

POWER BUCKET MACHINE

Original Filed Oct. 1, 1957 3 Sheets-Sheet 2

INVENTOR.
CHARLES J. PRANGE
BY Lynn R. Patta
ATTORNEY

Dec. 13, 1960 C. J. PRANGE Re. 24,908

POWER BUCKET MACHINE

Original Filed Oct. 1, 1957 3 Sheets-Sheet 3

INVENTOR.
CHARLES J. PRANGE
BY Lynn N. Patta
ATTORNEY

United States Patent Office

Re. 24,908
Reissued Dec. 13, 1960

24,908

POWER BUCKET MACHINE

Charles J. Prange, Lima, Ohio, assignor to Flexible Sewertool Corporation, Lima, Ohio, a corporation of Ohio Original No. 2,892,557, dated June 30, 1959, Ser. No. 687,536, Oct. 1, 1957. Application for reissue Apr. 25, 1960, Ser. No. 24,636.

14 Claims. (Cl. 214—103)

Matter enclosed in heavy brackets [ ] appears in the original patent but forms no part of this reissue specification; matter printed in italics indicates the additions made by reissue.

This invention relates to sewer cleaning machines of the drag bucket type wherein portable derricks are set adjacent consecutive manholes in a sewer line to be cleaned, and wherein a drag bucket is introduced into the sewer line through one of the manholes, is advanced into and then drawn back through the section of the sewer line between the manholes with a dredging action, is then hoisted through the manhole through which it was introduced, and is then dumped. The general object of this invention is to provide, in the hoist which operates at the manhole through which the filled bucket emerges, mechanism for elevating the bucket to a height above the upper level of a dump truck, then conveying it horizontally to a position above the truck, and then dumping it.

More specifically, the present invention contemplates a mechanism which, instead of opening the clam shell lips of the bucket as in the more conventional drag bucket dumping apparatus as disclosed in the pending application of Peter L. Ciaccio, S.N. 565,562, filed February 15, 1956, now Patent No. 2,846,101 for Drag Bucket Dumping Hoist, is operative to invert the bucket at the dumping position and to discharge its contents through the constantly open filling end of the bucket.

Further objects of the invention will become apparent in the ensuing specification and appended drawings, wherein.

Figure 1:
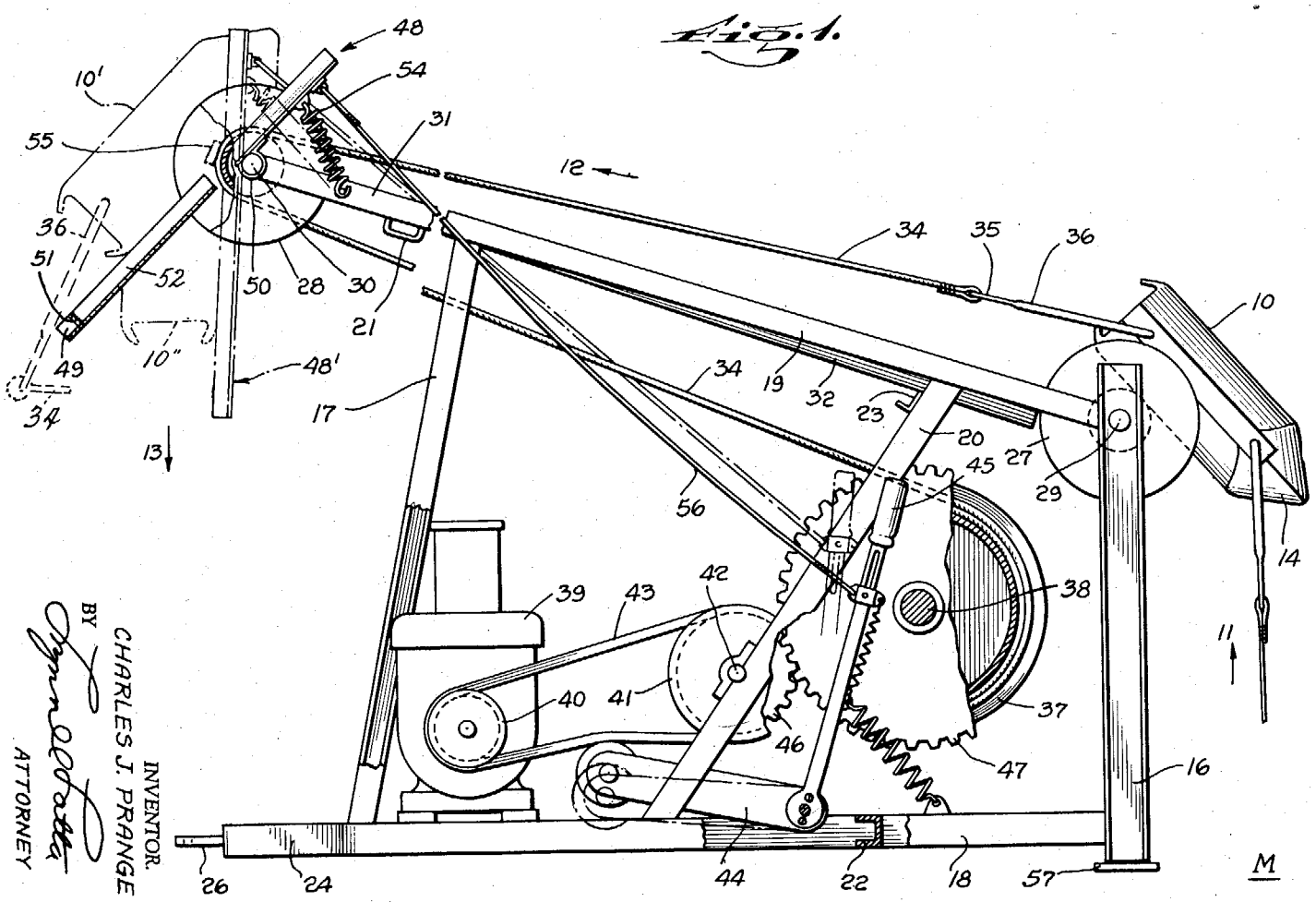
Fig. 1 is a side elevational view of a bucket dumping hoist embodying the invention, with parts broken away and shown in section.
Figure 2:
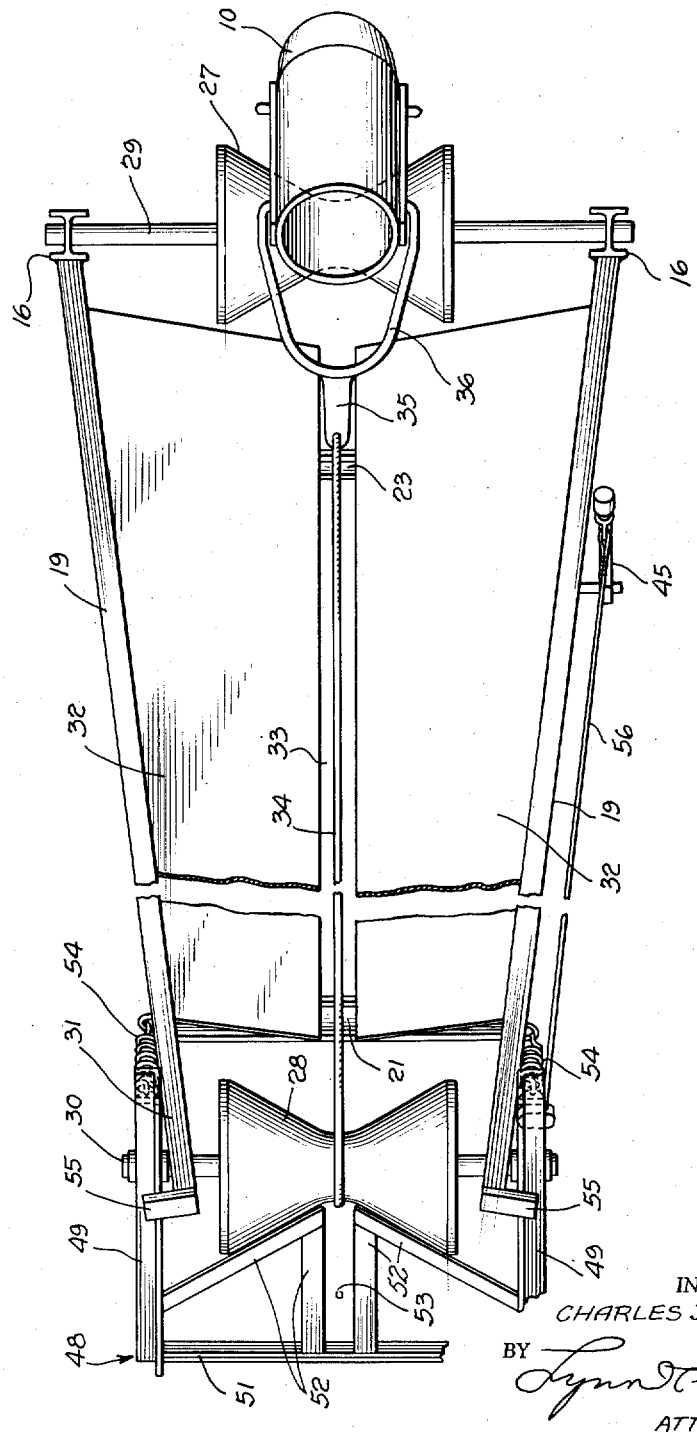
Fig. 2 is a plan view of the same.
Figure 3:
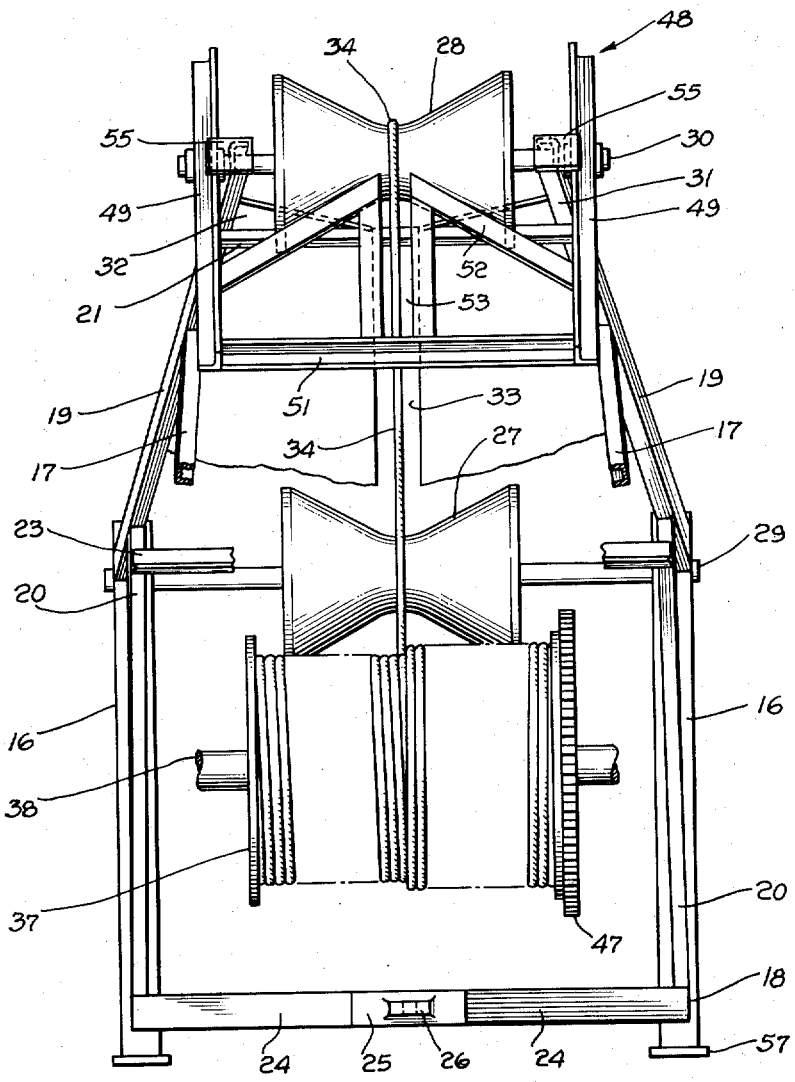
Fig. 3 is a rear end elevational view of the same.

Referring now to the drawings in detail, I have shown therein, as an example of one form in which the invention may be embodied, a drag bucket hoist adapted to hoist a drag bucket 10 from a sewer through a manhole disposed generally at the position indicated by the letter M in Fig. 1, to elevate the bucket as indicated by arrow 11 to the position in which the bucket is shown in full lines in Fig. 1, to then convey the bucket in a generally horizontal direction, inclined somewhat upwardly, as indicated by arrow 12, to approximately the position in which the bucket is shown in broken lines in Fig. 1 at 10' and, at this position, to tilt the bucket to a completely inverted position indicated at 10'', for discharging its contents into a truck.

The drag bucket 10 may be of the conventional type embodying clam shell lips 14 (which are normally closed together to constitute a bottom as shown) to retain the load of material in the filled bucket while it is being conveyed out of the sewer line and dumped. Alternatively, the bucket 10 can be a simple container with a fixed bottom and open at its opposite end. In either event, it is to be understood that the hoist of the present invention is operated at the manhole of entry (through which the bucket is inserted into and withdrawn from the sewer line)

and that a more conventional hoist (such as that shown in the above identified patent application) may be utilized in cooperation with the hoist of the present invention, being positioned at a distant manhole and operative to draw the bucket, closed end first, into the sewer line and to a position where filling operation is to be commenced. When the bucket has thus been positioned for the start of a filling operation, with its open forward end facing toward the hoist illustrated herein, this hoist is operated to first draw the bucket through the sewer line, filling the bucket by a dredging action, to then move the bucket around a guide pulley at the manhole of entry, and to then hoist the bucket through that manhole with its open end upward until it arrives at *a* [the] position *approximately corresponding to the position indicated at 10 in Fig. 1 of the drawings hereof, but suspended in a vertical position from an overhead cable* [shown at 10 in Fig. 1]. Reference may be made to the above mentioned patent application or the trade literature of Flexible Manufacturing Company illustrating conventional sewer cleaning systems of this type, for more complete information regarding the conventional portions of the system referred to above, in which the hoist of this invention constitutes an improvement.

Referring again to the drawings, my improved hoist embodies a frame or derrick structure including a pair of laterally spaced pillars 16 at the end thereof which is positioned adjacent the manhole, a pair of laterally spaced uprights 17 near the dumping end of the hoist, a pair of laterally spaced longitudinal sills 18 extending between and joining the lower ends of pillars 16 and uprights 17, a pair of laterally spaced header bars 19 extending between and joining the upper ends of pillars 16 and uprights 17, a pair of laterally spaced diagonal braces 20 extending between and secured to the sills 18 and header bars 19 in a manner to brace the respective side sections of the frame structure against longitudinal shifting of the upper portion thereof with respect to the lower portion, and suitable cross braces such as the spacer bars 21, 22 and 23 extending transversely between and joining the header bars 19 near their forward ends, the sills 18 near their rear ends, and the braces 20 respectively. The forward ends of sills 18 are joined by converging portions 24 thereof, bent inwardly from points just forwardly of the lower ends of uprights 17 and secured together by a bow plate 25 integrally joining the forward ends thereof. A hitch tongue 26 is attached to bow plate 25 for hitching the hoist to a tractor for transporting the hoist.

The hoist embodies conveyor means for guiding the bucket 10 in its elevated horizontal path 12, such conveyor means comprising a pair of guide rollers 27 and 28 journalled on respective shafts 29 and 30 at the respective rear and forward ends of the frame structure. Shaft 29 is mounted in the upper ends of pillars 16 and shaft 30 is mounted in the forward ends of header bars 19 projecting forwardly of uprights 17 to provide a pair of crane arms 31 adapted to overhang the rear end of a dump truck body. Rollers 27 and 28 are of conoidal pulley form, each having a waist section of minimum diameter and opposed conic end portions flaring to maximum diameter at their ends and providing opposed bearing surfaces between which the drag bucket 10 is cradled in the median longitudinal vertical plane of the apparatus as it passes around the rollers.

*The conveyor means for guiding the bucket 10 in its path 12 further includes, between* [Between] the rollers 27 and 28, a pair of downwardly converging guide plates 32 extend longitudinally of the frame, generally in the common plane of header bar 19, although projecting therebelow to some extent at their rear ends as indicated in Fig. 1. The upper, outer edges of plates 32 are attached (as by welding) to header bars 19 along the upper flanges of the latter and the lower, inner edges of plates 32 are supported upon and suitably secured (as by welding) to the spacer bars 21 and 23. Plates 32 cooperatively provide a fixed guide trough which supports the bucket 10 for sliding movement along path 12 between rollers 27 and 28.

The lower inner edges of guide plates 32 are laterally separated to provide a longitudinally extending slot 33 for reception of the hoisting cable 34 and the draw bar 35 of the hoisting clevis 36 by means of which the hoisting cable is attached to the bucket. The slot 33 functions further as a discharge space for clearing the guide trough of any foreign material that may spill from the bucket while travelling in path 12.

The hoist embodies a conventional winch drum 37 upon which the cable 34 is wound in order to effect the hoisting of the bucket 10. The cable 34 extends from the clevis 36 around the reduced central waist of roller 28, functioning as a pulley, and thence back to the upper side of drum 37 as shown in Fig. 1. Drum 37 is mounted on a supporting shaft 38 which in turn is suitably mounted in the frame by brackets which are omitted from the drawing for clarity. Drum 37 is driven from a motor 39 mounted upon sills 18, a belt drive including pulleys 40 and 41 attached to the motor drive shaft and to a countershaft 42 respectively, and a belt 43 travelling over the pulleys 40 and 41 and adapted to shift from a slack, non-driving condition to a tightened, driving condition through operation of a belt tightener unit 44 bearing against the lower stretch of the belt and embodying an actuator lever 45. A spur pinion 46, secured to power shaft 42 or to pulley 41, transmits the drive from pulley 41 through a bull gear 47 to the drum 37 (e.g. through shaft 38) in accordance with conventional drive mechanism as utilized in the hoists of the earlier apparatus identified above.

When the bucket reaches the pulley 28, it moves into engagement with a cradle indicated generally at 48, by means of which the bucket is guided in tilting to its inverted position at 10'' and is restrained from moving beyond that position. Cradle 48 comprises a pair of laterally spaced rails 49 mounted upon the end of roller shaft 30 through suitable bearings 50, and joined by a cross bar 51 at their lower ends. The cradle further includes a pair of fingers 52 of triangular form, comprised of transverse bars secured to the rails 49 and extending diagonally toward one another in substantial alignment with the flaring contour of the respective ends of roller 28, clearing the conical faces of the roller in adjacent relation thereto, together with longitudinal bars secured to the inner ends of these diagonal bars and to the cross bar 51 in laterally spaced relation to one another to provide a slot 53 for reception of the hoisting cable 34.

The cradle 48 is normally maintained yieldingly in the downwardly and forwardly inclined position shown in full lines in Fig. 1, by operation of a pair of coil springs 54 connected in tension between the arms 31 rearwardly of the fulcrum axis of shaft 30 and the upper end portions of rails 49 projecting above shaft 30, whereby the pull of the spring 54 acts in a clockwise direction in the tilting movement of the cradle.

The space between the rails 49 above the fingers 52 is unobstructed so that the bucket 10, as it is drawn along the path 12 into engagement with roller 28, may be projected between the rails 49 and may then tilt around the roller 28 until the side of the bucket comes to rest against the fingers 52 in the position 10' of Fig. 1. The bucket is then bridged between the fingers 52 and the roller 28 (its open forward end supported by fingers 52 and its rear end supported by roller 28) and in further operation of the hoist, will tilt downwardly to the position 10'' of Fig. 1, tilting the cradle 48 to the position 48' shown in broken lines in Fig. 1. Fig. 1, in the full-line showing of the cradle 48, shows the frame in section in a vertical plane normal to the axis of roller 28, cutting through the narrowed central waist portion of the roller and lying in the space between fingers 52, the remote finger being seen, and the near portion of the frame 48 being broken away.

The movement of cradle 48 is limited at the two positions shown in Fig. 1, by engagement with respectitve extremities of stop lugs 55 projecting laterally from the forward ends of arms 31. Thus the cradle 48 will be normally held by springs 54 in its receiving position shown in Fig. 1 and downward tilting movement will be limited at the dumping position 48' in which the bucket is substanttially vertical [from] *for* maximum efficiency in discharging its contents into the truck body.

To avoid straining or possibly damaging the cradle structure when its limit position 48' is reached, the invention preferably provides an automatic declutching connection between the cradle and the belt tightener lever 45. Such connection may consist simply in a tension link (e.g. cable or rod) 56 secured to the upper end of one of the rails 49 and secured to the lever 45 in a relation such that as the cradle 48 approaches its lower limit position 48', the slack in cable 56 (or any equivalent lost motion connection between the link 56 and either the cradle 48 or the lever 45 in the event a stiff rod is utilized) will be taken up and the final movement of cradle 48 will actuate the tightener 44 to loosen the belt 43 and thereby interrupt the transmission of power from motor 39 to winch drum 37.

The frame structure may include feet 57 for solidly supporting the frame on a pavement surface for the operation of the hoist. It may also include suitable transport dollies (not shown since they may be the same as are conventionally employed in hoists of this general class) which may be lowered into contact with the pavement or ground, raising the feet 57 from the ground and allowing the hoist to be transported as a trailer when hitched to a tractor through the tongue 26.

Briefly reviewing the operation of the apparatus, the bucket 10, having been filled by dredging action in a sewer, will be hoisted out of the sewer through a manhole at the position M by winding the cable 34 upon the drum 37, the end portion of the cable 34 adjacent the bucket 10 extending *upwardly* [downwardly] around roller 27 and bearing against the reduced central waist portion thereof, functioning as a pulley. As the bucket emerges from the manhole, it will be elevated along the path 11 until it contacts the roller 27, whereupon it will be tilted through the position shown in full lines *at 10* in Fig. 1 and to a position where it rests upon the guides 32 with its longitudinal axis parallel to the longitudinal axis of the guides. It will then be dragged horizontally and upwardly along path 12, sliding against guides 32 until it contacts roller 28, the open end portion of the bucket projecting between the spaced upper portions of rails 49 of cradle 48. Further movement of the cable will cause the bucket to tilt around roller 28, its open end tilting downwardly until it rests against fingers 52, whereupon the cradle 48 will be tilted downwardly to its limit position 48', in which position the bucket will have reached its full dumping position 10''. During the movement around the pulley 28 and the downward tilting of the bucket, the contents will be discharged into the body of a truck which has been backed beneath the dumping end of the hoist including arms 31, pulley 28 and cradle 48. When the downward limit position is reached, the operator may actuate lever 45 to interrupt the transmission of power or may stop the motor 39 if he chooses. *In* [in] the event he does not operate the apparatus to stop further movement of the bucket, the winch 37 will be automatically declutched from the motor 39 by the actuation of the belt tightener 24 through link 56, thus arresting the transmission of power to the cable.

*It will be apparent that, by interrupting the transmis-*

*sion of power to the winch drum 37 at a time when the cradle 48 is in the depressed position 48', the pull of the cable 34 against the lower end of cradle 48, applied through the bucket bail 36, will be relaxed so as to render the springs 57 operative to draw the cradle upwardly to its full line position shown in Fig. 1, until it is arrested by the stop 55, and that by re-applying the power to the winch drum 37, the cradle 48 will again be pulled down to the depressed position 48'. This operation may be utilized for shaking the bucket to dislodge its contents. This alternate application of power and arresting of power can be executed by manual manipulation of the control lever 45.*

*When the bucket has been cleared of its contents, the lever 45 can be moved to release the drum 37 for unreeling movement in response to pull applied to the section of cable attached to the nose of the bucket 10 and extending downwardly into the sewer, thereby returning the bucket from roller 28 to roller 27 thence around roller 27 and downwardly into the sewer for another loading operation.*

I claim:

1. A sewer-cleaning drag bucket dumping hoist, comprising, in combination: a horizontally elongated derrick frame having a receiving end to be positioned adjacent a manhole and a discharge end to be disposed above a dump truck for dumping a drag bucket thereinto, means at the top of said frame providing bucket-guiding and supporting conveyor means extending from end to end of said frame; a pair of guide rollers rotatably mounted in the respective ends of the frame and each having flaring end portions spaced apart at least the width of said bucket, for rolling, cradling support of a guide bucket passing thereover, one of said guide rollers having a central waist portion functioning as a pulley for travel of a bucket-carrying cable thereover and being disposed at said receiving end in a position to receive a bucket being vertically elevated from a manhole adjacent said receiving end while suspended on a vertical stretch of the cable guided by said central waist portion, and the other roller being disposed at said discharge end in a position to receive a bucket travelling along said conveyor means; and a cradle pivoted to said discharge end of the frame substantially at the axis of rotation of said other roller, adapted to receive said bucket while the rear end of the bucket is supported by said other roller, and cooperating with said other roller to guide the bucket in a downwardly tilting movement of its forward end for dumping the bucket.

2. A sewer-cleaning drag bucket dumping hoist, comprising, in combination: a horizontally elongated derrick frame having a receiving end to be positioned adjacent a manhole and a discharge end to be disposed at a suitable distance from such manhole for dumping the contents of a drag bucket; upwardly and laterally flaring bucket-guiding and supporting guide plates extending from end to end of said frame along the top thereof; a pair of guide rollers rotatably mounted in the respective ends of the frame and each having a central waist portion functioning as a pulley for travel of a bucket-carrying cable thereover and flaring end portions spaced apart at least the width of the bucket for rolling, cradling support of a guide bucket passing thereover, one of said guide rollers being disposed at said receiving end in a position to receive a bucket being vertically elevated from a manhole adjacent said receiving end while suspended on a vertical stretch of the cable guided by said central waist portion, and the other roller being disposed at said discharge end in a position to receive a bucket sliding along said guide plates; and a cradle pivoted to said discharge end of the frame substantially at the axis of rotation of said other roller adapted to receive the forward end of said bucket while the rear end of the bucket is supported by said other roller, and to guide the bucket in downwardly tilting movement around the axis of said other roller to a dumping position.

3. A sewer-cleaning drag bucket dumping hoist, comprising, in combination: a horizontally elongated derrick frame having an elevated receiving end to be positioned adjacent a manhole and a higher discharge end to be disposed at a suitable distance from such manhole and above a dump truck for dumping a drag bucket thereinto; means providing a bucket-guiding and supporting conveyor extending from end to end of said frame along the top thereof; a pair of guide rollers rotatably mounted in the respective ends of the frame and each having laterally spaced end portions for rolling, cradling support of a guide bucket passing thereover, each of said guide rollers having a central waist portion functioning as a pulley for travel of a bucket-carrying cable thereover, one of said rollers being disposed at said receiving end in a position to receive a bucket being elevated from a manhole adjacent said receiving end and the other roller being disposed at said discharge end in a position to receive a bucket travelling along said conveyor and to support the bucket in a downwardly tilting movement of its forward end for dumping the bucket; and a cradle pivoted to said discharge end of the frame substantially at the axis of rotation of said other roller and providing laterally spaced bucket engaging fingers adapted to receive the forward end of said bucket while the rear end of the bucket is supported by said other roller, and to guide the bucket in downwardly tilting movement to a dumping position; and means for limiting said downwardly tilting movement of said cradle to determine an optimum dumping position.

4. A sewer-cleaning drag bucket dumping hoist, comprising, in combination: a horizontally elongated derrick frame having a receiving end to be positioned adjacent a manhole and a discharge end to be disposed at a suitable distance from such manhole for dumping the contents of a drag bucket, means at the top of said frame providing a bucket-guiding and supporting conveyor extending from end to end of said frame inclined upwardly from said receiving end to said discharge end, and projecting beyond said discharge end for overhanging a dump truck; and a pair of guide rollers rotatably mounted in the respective ends of the frame and each having end portions embodying frusto conical bearing surfaces spaced axially substantially the width of the bucket for rolling, cradling support of a guide bucket passing thereover, and each having a central waist portion functioning as a pulley for travel of a bucket-carrying cable thereover, one of said pulleys being disposed at said receiving end in a position to receive a bucket being vertically elevated from a manhole adjacent said receiving end while suspended on a vertical stretch of the cable guided by said central waist portion, and the other roller being disposed at said discharge end in a position to receive a bucket travelling along said conveyor; and a cradle pivoted to said discharge end of the frame substantially at the axis of rotation of said other roller, adapted to receive said bucket while the rear end of the bucket is supported by said other roller, and cooperating with said other roller to guide the bucket in a downwardly tilting movement of its forward end for dumping the bucket.

5. A hoist as defined in claim [7] *4*, [wherein said cradle is adapted to receive the forward end of said bucket and to guide the same in downwardly tilting movement to a dumping position while the rear end of the bucket is supported by said other roller;] said hoist further including means for limiting said downwardly tilting movement of said cradle to determine an optimum dumping position.

6. A sewer-cleaning drag bucket dumping hoist, comprising, in combination: a drag bucket; a cable for hoisting the same; a derrick frame having an elevated receiving end to be positioned adjacent a manhole and a higher discharge end to be disposed at a suitable distance from such manhole for dumping the contents of the drag bucket; means at the top of said frame providing a bucket-guiding and supporting conveyor extending from side to side of said frame; a pair of guide rollers rotatably mounted on transverse axes in the respective ends of the frame and each having a narrowed central waist portion functioning as a pulley for travel of a bucket-carrying cable thereover and radially enlarged axially spaced end portions for rolling, cradling support of a guide bucket passing thereover, one of said guide rollers being disposed at said receiving end in a position to receive a bucket being vertically elevated from a manhole adjacent said receiving end while suspended on a vertical stretch of the cable guided by said central waist portion, and the other roller being disposed at said discharge end in a position to receive a bucket moving along said conveyor and to support the bucket in a downwardly tilting movement of its forward end for dumping the bucket; a winch including a drum for winding up said cable and a prime mover for rotating said drum, said drum being located beneath said conveyor between the sides of the frame and said cable extending from said one roller to said other roller and thence downwardly around said other roller and in a return direction to said drum and a cradle pivoted to said discharge end of the frame substantially at the axis of rotation of said other roller and adapted to receive the forward end of said bucket and to guide the same in downwardly tilting movement to a dumping position while the rear end of the bucket is supported by said other roller; a clutch for transmitting drive from said power plant to said drum; and means interconnecting said cradle and clutch to interrupt said drive when said bucket reaches a dumping position, whereby to limit the downward tilting of said cradle.

*7. A sewer-cleaning drag bucket dumping hoist, comprising, in combination: a horizontally elongated derrick frame having a receiving end to be positioned adjacent a manhole and a discharge end to be disposed above a dump truck for dumping a drag bucket thereinto, means at the top of said frame providing bucket-guiding and supporting conveyor means extending from end to end of said frame; a pair of guide rollers rotatably mounted in the respective ends of the frame and each having flaring end portions spaced apart at least the width of said bucket, for rolling, cradling support of a guide bucket passing thereover, one of said guide rollers having a central waist portion functioning as a pulley for travel of a bucket-carrying cable thereover and being disposed at said receiving end in a position to receive a bucket being vertically elevated from a manhole adjacent said receiving end while suspended on a vertical stretch of the cable guided by said central waist portion, and the other roller being disposed at said discharge end in a position to receive a bucket travelling along said conveyor means, and to provide a fulcrum around which said bucket can tilt downwardly to a dumping position; a cradle pivoted to said discharge end of the frame, said cradle including a bucket supporting portion having a normal position extending generally downwardly from said other roller and adapted to receive said bucket as it is tilted downwardly around said other roller; and resilient means acting between said cradle and said frame and loading said cradle for upward movement to said normal position from a position depressed below the same, said resilient means yielding to the pull of the cable applied through the bucket to the lower portion of said cradle to move the cradle and bucket downwardly from said normal position to said depressed position.*

*8. A machine as defined in claim 7, wherein said forward end of the frame is provided with stop means against which said cradle, in said normal position, will engage to restrain movement of the cradle above said normal position.*

*9. A machine as defined in claim 7, wherein said bucket supporting portion of the cradle comprises a pair of side arms having means providing said pivotal connection with the frame, a cross bar extending transversely between and joining the lower ends of said side arms, and a pair of intermediate longitudinal members secured to said cross bar and extending upwardly therefrom substantially in the plane of said side arms in positions adjacent but spaced laterally from the longitudinal median axis of said cradle and terminating just short of said other roller.*

*10. A machine as defined in claim 7, wherein said bucket supporting portion of the cradle comprises a pair of side arms having means providing said pivotal connection with the frame, a cross bar extending transversely between and joining the lower ends of said side arms, and a pair of intermediate longitudinal members secured to said cross bar and extending upwardly therefrom substantially in the plane of said side arms in positions adjacent but spaced laterally from the longitudinal median axis of said cradle and terminating just short of said other roller; and bucket supporting portion of the cradle, in said normal position, being disposed in a plane substantially intersecting the axis of said other roller.*

*11. A sewer-cleaning drag bucket dumping hoist, comprising, in combination: a horizontally elongated derrick frame having a receiving end to be positioned adjacent a manhole and a discharge end to be disposed above a dump truck for dumping a drag bucket thereinto, means at the top of said frame providing bucket-guiding and supporting conveyor means extending from end to end of said frame; a pair of guide rollers rotatably mounted in the respective ends of the frame and each having flaring end portions spaced apart at least the width of said bucket, for rolling, cradling support of a guide bucket passing thereover, one of said guide rollers having a central waist portion functioning as a pulley for travel of a bucket-carrying cable thereover and being disposed at said receiving end in a position to receive a bucket being vertically elevated from a manhole adjacent said receiving end while suspended on a vertical stretch of the cable guided by said central waist portion, and the other roller being disposed at said discharge end in a position to receive a bucket travelling along said conveyor means, and to provide a fulcrum around which said bucket can tilt downwardly to a dumping position; a cradle pivoted to said discharge end of the frame, said cradle including a bucket engaging portion having a normal position disposed in a plane substantially on the axis of said other roller and inclined downwardly and forwardly therefrom, said cradle being adapted, as the bucket tilts downwardly around said other roller, to receive said bucket while the bucket is supported by said other roller; and coil spring means acting in tension between said cradle and said discharge end of the frame and loading said cradle for upward return to said normal position from a position depressed therebelow, said coil spring means yelding to the pull of the cable applied through said bucket to the lower portion of said cradle to permit said cradle to move downwardly to said depressed position.*

*12. A sewer cleaning drag bucket dumping hoist, comprising, in combination: a horizontally elongated derrick frame having a substantially vertical receiving end to be positioned adjacent a manhole and a discharge end to be disposed above a dump truck for dumping the drag bucket thereinto; means at the top of said frame providing bucket-guiding and supporting conveyor means extending from end to end of said frame and including a pair of guide rollers rotatably mounted in the respective ends of the frame at the top thereof and each having flaring end portions spaced apart at least the width of said bucket, for rolling, cradling support of a drag bucket passing thereover, said rollers having respective central waist portions each functioning as a pulley for travel of a bucket-carrying cable thereover, one of said rollers being disposed in a position at the top of the receiving end of said frame such that a bucket being elevated from a manhole will be guided vertically upwardly adjacent said receiving end while suspended on a vertical stretch*

*of the cable guided by said central waist portion, and the other roller being disposed in a position at said discharge end such that it will receive a bucket travelling along said conveyor means between said rollers and will function to guide the bucket in a downwardly tilting movement thereof; a cradle pivoted to said discharge end of the frame, said cradle including a bucket supporting portion having a normal position extending generally downwardly from said other roller and adapted to receive said bucket as it is tilted downwardly around said other roller; and resilient means acting between said cradle and said frame and loading said cradle for upward movement to said normal position from a position depressed below the same, said resilient means yielding to the pull of the cable applied through the bucket to the lower portion of said cradle to move the cradle and bucket downwardly from said normal position to said depressed position.*

*13. A sewer cleaning drag bucket dumping hoist, comprising, in combination: a horizontally elongated derrick frame having a substantially vertical receiving end to be positioned adjacent a manhole and a discharge end to be disposed above a dump truck for dumping the drag bucket thereinto, a generally horizontal top portion and a base therebelow; a drag bucket means at the top of said frame providing bucket-guiding and supporting conveyor means extending from end to end of said frame and including a pair of guide rollers rotatably mounted in the respective ends of said top portion and each having flaring end portions for rolling, cradling support of said drag bucket when passing thereover, said rollers having respective central waist portions each functioning as a pulley for travel of a bucket-carrying cable thereover, one of said rollers being disposed in a position at the top of the receiving end of said frame such that a bucket being elevated from a manhole will be guided vertically upwardly adjacent said receiving end while suspended on a vertical stretch of the cable guided by said central waist portion, and the other roller being disposed in a position at said discharge end such that it will receive a bucket traveling along said conveyor means between*

*said rollers and will function to guide the bucket in a downwardly tilting movement thereof; a power operated winch drum carried by said base below said top portion; a cable attached to said bucket and adapted to extend upwardly and around said one roller at the receiving end of the machine, thence parallel to said conveyor means and around the other roller and downwardly therefrom, and thence beneath said top portion of the frame to said winch drum and wound thereon, said cable exerting a downward pull upon said bucket after it has tilted downwardly around said other roller; a cradle pivoted to said discharge end of the frame, said cradle including a bucket supporting portion having a normal position extending generally downwardly from said other roller and adapted to receive said bucket as it is tilted downwardly around said other roller; and resilient means acting between said cradle and said frame and loading said cradle for upward movement to said normal position from a position depressed below the same, said resilient means yielding to the pull of the cable applied through the bucket to the lower portion of said cradle to move the cradle and bucket downwardly from said normal position to said depressed position.*

*14. A machine as defined in claim 13, wherein said cradle is positioned and movable so as to support said bucket in substantially tangent alignment with said roller throughout its movements between said normal and depressed positions.*

References Cited in the file of this patent or the original patent

UNITED STATES PATENTS

| | | |
|---|---|---|
| 512,988 | McTurner et al. | Jan. 16, 1894 |
| 878,526 | Gunn | Feb. 11, 1908 |
| 963,034 | Connell | July 5, 1910 |
| 967,733 | Curtiss et al. | Aug. 16, 1910 |
| 1,000,988 | Burkett | Aug. 22, 1911 |
| 1,415,223 | Crossley | May 9, 1922 |
| 1,933,924 | Nickerson | Nov. 7, 1933 |
| 2,468,542 | Caldwell | Apr. 26, 1949 |